Aug. 27, 1935. G. E. OTIS 2,012,285
METHOD OF AIR TEMPERATURE REGULATION
Filed May 25, 1933
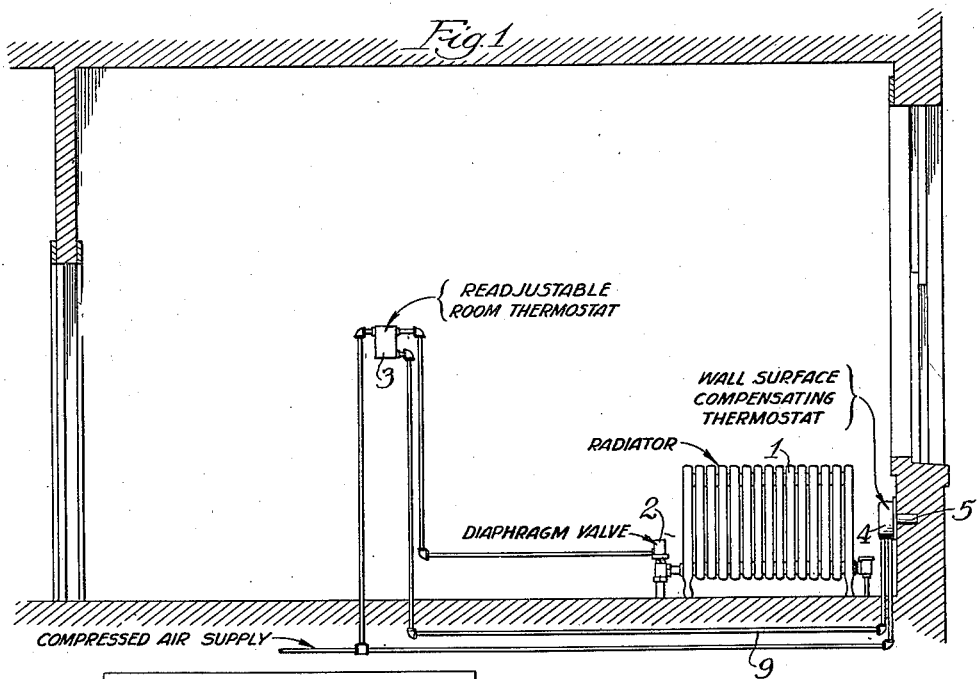
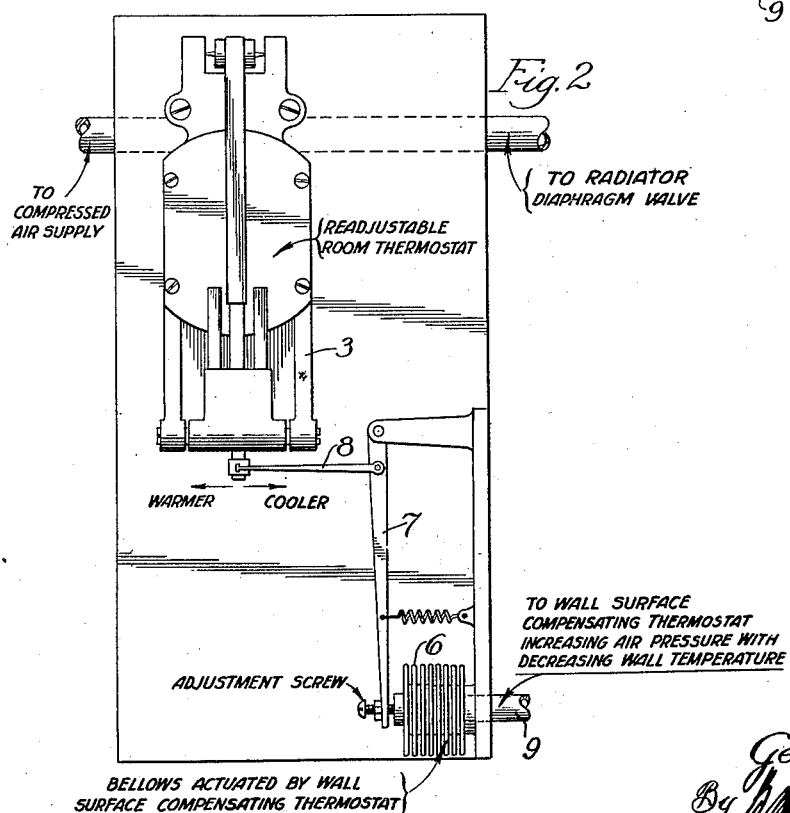

Patented Aug. 27, 1935

2,012,285

UNITED STATES PATENT OFFICE 2,012,285

METHOD OF AIR TEMPERATURE REGULATION

Gerald E. Otis, Moline, Ill., assignor to The Herman Nelson Corporation, Moline, Ill.; a corporation of Illinois Application May 25, 1933, Serial No. 672,789

2 Claims. (Cl. 257—2)

The present invention is directed to a method of temperature regulation in rooms designed for human occupancy, whereby the air temperature maintained for comfort is varied within a certain range to partially compensate for variations in the rate of radiant heat transfer from the occupants to the enclosing walls, etc., caused by variations in the inner surface temperatures of said enclosing walls as a result of varying outdoor conditions.

In its mechanical aspects, the invention is directed to a method of regulating the room thermostat which directly controls the heating appliances in such a way as to vary the temperature at which the air within the room is maintained in sufficient degree to compensate in cold weather for the loss of body heat due to direct radiation from the human body to the cooler walls of the room.

Thermal comfort in human beings is determined by the ease with which the heat of animal metabolism is dispersed from the body. Animal life is maintained by oxidation, and oxidation produces heat. Man and other warm-blooded animals are so constituted that their bodies must be kept at virtually constant temperature, which means that this heat—called the heat of metabolism—must be dispersed as fast as it is produced. The rate at which this heat is produced, or the rate of metabolism, depends upon the degree of physical activity and determines the rate at which it must be dispersed.

This heat dispersion is accomplished by transference to the atmosphere and adjacent objects, principally (about 87½%) from the surface of the body. A portion of this heat is transmitted to the enveloping atmosphere by convection and through the evaporation of perspiration, while another portion is radiated to surrounding objects. However, man is so constituted that the dispersion of heat through the process of evaporation is physiologically reserved for emergencies, and in his ordinary indoor pursuits is of little consequence. Under such circumstances, the vast majority (at least 75%) of the heat of metabolism must be dispersed by convection and radiation.

In the prior art, little or no practical consideration has been given to discrimination between the results of these two methods of heat dispersion. It has been customary to consider the aggregate as transferred to the air of the room, and to merely attempt to adjust the rate of transfer to the needs of the occupants by maintaining the air temperature within a predetermined range. Air temperature (together with air motion) governs the rate of heat transfer by convection but has no direct bearing on the rate of radiation. Therefore, the common procedure must assume that virtually all of the heat is dispersed by convection, or that the radiation rate is virtually constant and of minor importance. The second proposition is the only one that may be entertained and careful investigation shows that it is unsound.

We are assured from tests conducted by the Smithsonian Institution (Smithsonian Miscellaneous Collections, volume 81, Number 6) that under ordinary indoor conditions the amount of heat radiated from the human body may exceed that dispersed by convection, and we are bound to conclude from a consideration of the fundamental concepts of radiant heat behavior and the conditions of the case that this is subject to substantial variation. Ample evidence of this is found in the frequent personal experience of feeling chilled in a room under temperature conditions which at other times would be entirely satisfactory; and if one recalls his experience of this kind and can remember the attendant circumstances, he will realize that they occurred when it was cold out of doors and especially following a period when the building had been allowed to cool down.

The reason for this is to be found in the fact that the radiation rate is not influenced by the air temperature but is governed by the temperatures of surrounding material bodies. Furniture and similar objects, the temperature of which is virtually established by that of the room, may be disregarded, but in the case of the building structure, particularly outer walls, the inner surface temperatures of which depend upon outdoor conditions, the rate varies considerably. Any change in outdoor temperature or solar heat intensity is reflected in the exposed portions of the building structure and in the rate of radiant heat exchange between the same and the room occupants, thus affecting the comfort of the room occupants.

According to generally accepted mathematical data (Stefan-Boltzman formula), the inter-radiation rate varies as the relative differences in the fourth powers of the absolute temperatures of the related objects. Hence, the rate of radiant heat transfer from the room occupants to the inner surface of an outer wall would be two or three times as great in sub-zero weather as in mild weather, and much more when the wall is shaded than when it is exposed to intense sunlight. This does not mean that a person seated in the room would radiate two or three times as much heat in cold weather as in mild weather, because only a portion of the total heat radiated by his body impinges on exposed walls. In calculating the amount of radiant heat interchanged between two surfaces, the solid angle subtended by one at the other must be considered. Nevertheless, it signifies that in the average case the variation in radiant heat emission due to varying outdoor conditions is sufficient to cause discomfort unless corrective measures are taken.

The present invention is directed toward this end and proposes to compensate for the increased rate of heat dissipation through radiation to cold walls by retarding the transfer through convection by increasing the air temperature. Observations indicate that in the ordinary class of buildings, a change in room temperature of about five degrees Fahr. will satisfactorily compensate for the widest variation that is liable to occur in the inner surface temperature of the exposed walls, and I rely upon this discovery in the present invention.

The primary object of this invention is to provide a method of regulating the air temperature of occupied rooms to insure greater all-weather comfort, and I accomplish this by compensating for variations in the wall surface temperatures with variations in the room air temperatures, as will be made more clear by a consideration of the accompanying drawing, which illlustrate apparatus of a suitable and convenient form for carrying out the operations constituting the method of the present invention.

In the drawing:

Figure 1 is a cross sectional elevation of an outside living room in which the mechanism of the present invention is installed; and Fig. 2 is a front elevation of a readjustable room thermostat adapted to be controlled in comformity with the principles of the present invention.

For purposes of illustration, the apparatus shown embodies a direct radiator 1 provided with a diaphragm valve 2 for controlling the steam supply to the radiator, and a readjustable room thermostat 3 suitably connected with said diaphragm valve for operating the same. A compensating thermostat 4 or similar device is mounted on the inner surface of an exposed wall.

In the preferred embodiment illustrated, the thermostatic control mechanism is of the well known compressed air type, but it will be understood by those skilled in the art that electrical or other equivalent devices may be employed for the same purpose.

The compensating thermostat 4 is provided with a reasonably air-tight cover and so arranged that the thermostatic element is primarily responsive to the wall surface temperature rather than to local air temperatures. A convenient method of securing this result is by providing the compensating thermostat with a wall plug 5 preferably of metal of high thermal conductivity which is imbedded directly into the wall, so that the temperature of the compensating thermostat will at all times be maintained at or near the same degree as the temperature at the wall surface.

Fig. 2 illustrates an enlarged view of one type of readjustable room thermostat, which consists of the usual adjustable thermostat 3, together with suitable means, which, through the medium of the bellows motor 6, lever 7 and link 8, serve to control the adjustment of the thermostat according to the air pressure of the bellows motor 6 which is connected to the compensating thermostat through the airline 9.

In the operation of the arrangement illustrated, the readjustable thermostat may be set to control the radiator 1 so as to maintain an air temperature in the room over a range of adjustments determined by the air pressure in the airline 9, and this pressure will be determined by the compensating thermostat 4 in response to variations in the surface temperature of the exposed wall, with the result that the room temperature will be maintained at some point, for example 70° F., when the wall temperature is at some point, say 60° F., and gradually elevated to some point, for example 75° F., as the exposed wall surface temperature is lowered to some point, for example 20° F. In this manner increased radiation from the bodies of the occupants of the room, occasioned by lowering of the temperature of the outside wall surfaces, will be offset and compensated for by increased room air temperatures, so that chilling effect due to any abnormal loss of body heat will be prevented and a feeling of comfort maintained.

By properly adjusting the action of the two thermostats with due regard to the local conditions present in the room under control, it will be possible to better maintain the temperature required for bodily comfort than has heretofore been possible in cases where the maintenance of a constant room temperature, irrespective of other factors, has been the end in view.

Although the invention has been described with reference to the use of a steam radiator as a source of heat, and with reference to the use of thermostatic mechanism operable by air pressure, it will be understood that the method of the present invention is applicable for use in the control of other forms of heating appliances, of whatsoever character, and that it is not the intention in any way to limit the invention to a method performed by mechanism of the particular class shown for purposes of illustration.

I claim:

1. The method of regulating the air temperature of a room by thermostatically diminishing or increasing the supply of heat to the room in response to temperature variations of the room air above and below a desired temperature and in thermostatically inversely varying said desired temperature in response to temperature variations in the interior wall surface of the room to compensate for variations in the radiation of body heat from the room occupants due to variations in wall surface temperatures.

2. Mechanism for regulating the air temperature of a room, including controllable means for heating or cooling the air, thermostatic means responsive to the air temperature within the room for controlling said heating or cooling means, and thermostatic means responsive to the inner surface temperature of the enclosing structure to cause compensating inverse adjustment of the first mentioned thermostatic means in the amount required to compensate for variations in the radiation of body heat from the room occupants due to variations in wall surface temperatures.

GERALD E. OTIS.